E. SOLVAY.
Apparatus for Continuous Decantation in the Ammonia Soda Process.
No. 196,259.          Patented Oct. 16, 1877.
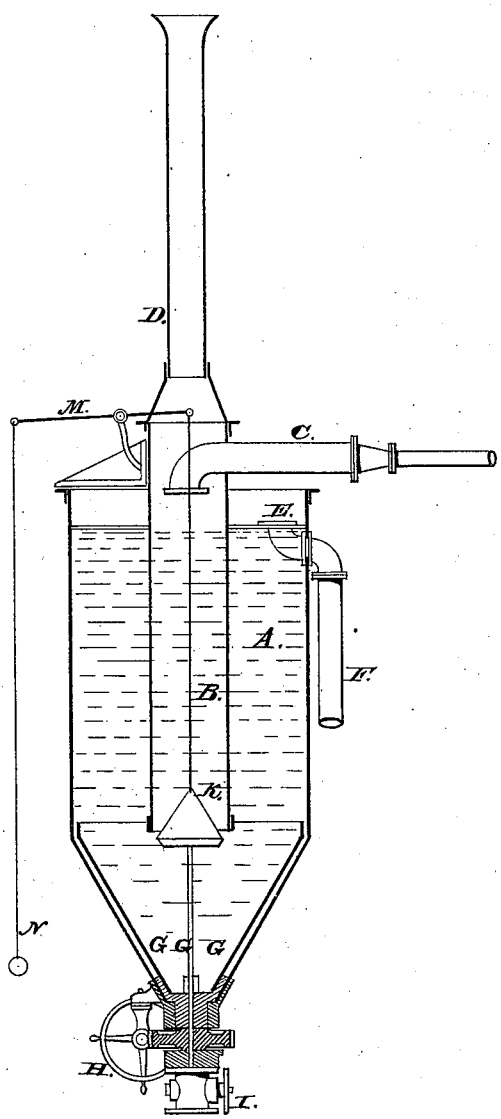

UNITED STATES PATENT OFFICE.

ERNEST SOLVAY, OF BRUSSELS, BELGIUM.

IMPROVEMENT IN APPARATUS FOR CONTINUOUS DECANTATION IN THE AMMONIA-SODA PROCESS.

Specification forming part of Letters Patent No. 196,259, dated October 16, 1877; application filed May 6, 1876.

*To all whom it may concern:*

Be it known that I, ERNEST SOLVAY, of Brussels, in the Kingdom of Belgium, manufacturer, have invented certain improvements in the manufacture of carbonates of soda, and in processes and apparatus used in such manufacture, of which the following is a specification:

This invention relates to certain improvements in apparatus for decanting solutions from precipitates or insoluble substances held in suspension therein, and is particularly designed for separating the solutions of chloride of sodium or calcium from the lime in the manufacture of carbonate of soda by the ammoniacal process, for the purpose of saving and utilizing said solutions, instead of letting them escape as waste.

The invention consists in a vessel into which the solutions containing the substances in suspension can be continuously discharged, so constructed that the suspended substances will fall to the bottom and be there collected, while the solution will flow off at the top in a continuous stream into a proper receptacle for collection, provision being made for the removal of the precipitated substance collected at the bottom from time to time, as more fully hereinafter set forth.

The drawing represents a vertical section of my improved apparatus, in which the letter A represents an upright cylindrical vessel, of suitable dimensions, provided with a conical bottom.

The letter B represents a tube extending downwardly into the vessel A, terminating near the bottom thereof, its upper end being provided with a chimney, D, for the purpose to be hereinafter described.

The lower end of said tube is open, and is provided with a conical downwardly-opening valve, K, secured by means of a vertical rod, extending upward in the tube B to a lever, M, to one end of which it is attached, the other end of said lever extending outside of said tube B, and being provided with a rod, N, extending below, by means of which the valve K can be operated to open or close the tube B, for the purpose to be hereinafter explained.

The letter C represents a pipe extending from the boiler or tank containing the solution and suspended insoluble matter, said tube passing through the upper part of the tube B at one side, and terminating in a bend in the upper part of said tube, through which the solution and suspended matter are introduced into the apparatus.

The letter E represents a pipe extending from the upper part of the vessel A to a pipe, F, which conducts the escaping solution to a proper receptacle.

The letter G represents a series of inclined radial arms secured to a short shaft journaled in a bearing at the apex of the conical bottom, said shaft extending through the bottom of the vessel, and being suitably packed to prevent the escape of the solution. To the lower end of said shaft is secured a beveled gear-wheel, meshing with a suitable pinion on a driving-shaft, by means of which the arms G, which lie in close contact with the conical bottom, are actuated in order to scrape off the deposited precipitate when it is required to discharge the same.

The letter I represents a faucet or cock at the apex of the conical bottom, through which said precipitate is discharged.

The operation of my improved apparatus is as follows: The solution and suspended matter are allowed to flow continuously into the tube B from the boiler in which they are formed, being discharged under pressure, if convenient, and from the said pipe pass into the vessel A, the flow being regulated by means of the valve K, so as to prevent the washing up of any deposit collected on the conical bottom of said vessel. The solution enters the apparatus, flowing downward in the tube B toward the bottom thereof, the lime or other matter held in solution settling quietly by its own gravity on the bottom of the vessel, and the solution flowing upwardly and off through a pipe, E F, into a proper receptacle, where it is saved for the separation of the salts it contains. The precipitate collected in the bottom of the vessel is discharged from time to time through the faucet I, the agitator G serving to scrape it from the bottom and deliver it to the opening at the apex of the bottom, from which the faucet extends. The steam entering with the solution escapes through the chimney D without entering the vessel, thus preventing any agitation of the solution after it enters said vessel.

The apparatus as thus constructed presents a great advantage over the large tanks heretofore employed for the same purpose, as it occupies but little space, while it permits the solution and deposit to be continuously separated. By causing the liquid to take first a downward and then an upward direction through the apparatus the decantation is greatly facilitated.

What I claim, and desire to secure by Letters Patent, is—

1. In an apparatus for continuous decantation, the combination, with the tube B, of the chimney D, forming a continuation thereof for the escape of steam, substantially as set forth.

2. In an apparatus for continuous decantation, the combination, with the tube B, of the conical valve K, for regulating the flow of the solution into the vessel A, and preventing the precipitate from being washed up off the bottom, substantially as set forth.

3. The combination of the vessel A having a conical bottom, tube B with its chimney and valve, and the induction and eduction pipes C E, the whole arranged to operate substantially as and for the purposes specified.

ERNEST SOLVAY.

Witnesses:
W. H. KIRKPATRICK,
R. S. KIRKPATRICK.